United States Patent [19]

Baker

[11] 4,383,552
[45] May 17, 1983

[54] ADJUSTABLE CHOKE

[75] Inventor: William T. Baker, Millersburg, Ohio

[73] Assignee: Multi-Products Company, Millersburg, Ohio

[21] Appl. No.: 312,160

[22] Filed: Oct. 16, 1981

[51] Int. Cl.³ .............................................. F15D 1/02
[52] U.S. Cl. ...................................... 138/46; 138/43; 137/504; 239/439
[58] Field of Search ................... 138/46, 42, 43, 44; 137/504, 498, 495, 625.37; 239/438, 439, 580, 239/570, 572, 452

[56] References Cited

U.S. PATENT DOCUMENTS

| | | | |
|---|---|---|---|
| 1,602,033 | 10/1926 | McCarthy | 138/46 |
| 2,093,015 | 9/1937 | Madden | 137/498 |
| 2,411,667 | 7/1942 | Mowrey | 138/45 |
| 2,541,464 | 2/1951 | Davies | 137/504 X |
| 2,668,555 | 4/1951 | Bartolat | 137/498 |
| 2,678,066 | 5/1951 | Carter | 138/45 |
| 2,829,674 | 6/1954 | Segelhorst et al. | 138/45 |
| 2,878,836 | 5/1957 | Binks | 138/45 |
| 2,939,487 | 8/1957 | McLean et al. | 239/452 |
| 2,984,261 | 4/1958 | Kates | 138/46 |
| 3,434,493 | 3/1969 | Owens | 137/504 X |

Primary Examiner—John W. Shepperd
Assistant Examiner—William R. Sharp
Attorney, Agent, or Firm—Fay & Sharpe

[57] ABSTRACT

An adjustable choke for automatically regulating high velocity flow through a pipe line is provided. The choke comprises a generally cylindrical elongated body including an axially-directed inlet port at one end, means for selectively controlling flow through the regulator at the other end, and a radially-directed outlet port intermediate of the body. A pair of slidable, annular rings contained in the body adjacent the inlet port comprise an upstream ring and a downstream ring. Each of the rings are spring biased from the other. The upstream ring includes a flow passageway and a flow obstructing portion. The downstream ring includes a plurality of flow passageways, at least one of said downstream ring flow passageways being disposed out of communicable flow alignment with the upstream ring flow passageway. Upon impingement of sufficient flow against the obstructing portion of the upstream ring, the upstream ring is slid into abutment with the downstream ring for closing the one downstream ring flow passageway and for limiting fluid flow through the choke. Upon dissipation of the sufficient flow, the upstream ring is spring biased away from the downstream ring. The means for selectively controlling the flow is selectively, operatively engaged to the downstream ring whereby the downstream ring may be selectively slid into abutment with the upstream ring for closing the one downstream ring flow passageway. The means for selectively controlling also includes a selectively advanceable valve stem for closing the downstream ring flow passageways other than the one downstream ring flow passageway.

17 Claims, 3 Drawing Figures

U.S. Patent  May 17, 1983  4,383,552

ADJUSTABLE CHOKE

BACKGROUND OF THE INVENTION

This invention pertains to the art of flow regulating devices and, more particularly, to a selectively adjustable, automatic flow regulating device.

The invention is particularly applicable to a flow regulating device for regulating the flow of a fluid such as oil or gas through a pipe line in the natural gas and oil industry. However, it will be appreciated to those skilled in the art that the invention could be readily adapted for use in other environments as, for example, where similar flow regulating devices are employed to regulate other types of fluid or gaseous flow.

Automatic fluid flow control device for regulating the flow of gas and oil from a well have primarily been concerned with regulating the ratio of oil and gas in a flowing or pumping well. Such devices are of limited usefulness in automatically regulating flow from a well which is alternately and automatically opened and closed. In particular, it has been found that when a closed well is initially opened, a high pressure peak of flow issues from the well. Such high pressure peaks with an associated high velocity flow, usually exceed the capabilities of measuring apparatus used to measure the flow from the well. That portion of flow associated with the pressure peak which is not precisely measured is, thus, lost to the owner of the well in the usual situation where the owner is selling the well production to an oil or gas company.

The present invention contemplates a new and improved adjustable choke for regulating the fluid flow through a pipe line prior to the encounter with the measuring device. The invention overcomes the problems of unmeasured flow from a well and others, to provide a new, adjustable choke which is simple in design, economical to manufacture, readily adaptable to a plurality of flow regulating uses in pipe line environments having a variety of dimensional characteristics, easy to install, easy to remove, and which provides improved, automatic flow regulation.

BRIEF SUMMARY OF THE INVENTION

In accordance with the present invention, there is provided an adjustable choke apparatus for regulating flow through a pipe line comprising a housing including an inlet port and an outlet port. A first adjustable member having a first port is contained in the housing contiguous to the inlet port. A second adjustable member including a second port, at least one third port, an opposed end face configured for flow-sealing engagement with a first end face of the first member, and an outlet end face is contained in the housing and is biased away from the first member with means for compressible biasing. The second port is aligned with the first port. Means are provided for selectively sealing the second port at the other end face. Means are provided for selectively engaging the first end face with the opposed end face for closing the third port, whereby upon impingement of a relatively high pressure flow against the first adjustable member, the first member is effected into flow-sealing engagement with the second adjustable member and the third port is closed against flow. Upon dissipation of the relatively high pressure flow, the first member is biased away from the second member to open the third port to flow.

In accordance with another aspect of the present invention, the first and the second adjustable members comprise annular rings. The first and second ports are centrally and axially aligned in the rings respectively.

In accordance with yet another aspect of the present invention, the third port comprises a plurality of spaced peripheral ports about the second port.

In accordance with a further aspect of the present invention, the means for selectively engaging the first end face with the opposed end face comprises a selectively advanceable shaft received in the housing at an end opposite of the inlet port. The shaft is threadedly received in the housing and includes an axial passageway, axially aligned with the second fluid port whereby upon engagement of the shaft to the second adjustable member, a flow path exists from the second port through the axial passageway.

In accordance with yet a further aspect of the present invention, a selectively advanceable valve stem is received in the axial passageway for selective sealing engagement to the second port at the other end face.

In accordance with a more limited aspect of the present invention, the shaft includes at least one radially-directed flow passageway communicating the axial passageway with the outlet port.

In accordance with the present invention, there is provided a flow regulator for automatically limiting high velocity flow through a pipe line. The regulator comprises a generally cylindrical elongated body having an axially-directed inlet port at one end, means for selectively controlling flow through the regulator at an other end, and a radially-directed outlet port intermediate of the body. A pair of slidable, annular rings are contained in the body adjacent the inlet port comprising an upstream ring and a downstream ring. Each of the pair is spring biased from the other. The upstream ring includes a flow passageway and a flow obstructing portion. The downstream ring includes a plurality of flow passageways, at least one of the downstream ring flow passageways being disposed out of communicable flow alignment with the upstream ring flow passageway whereby upon impingement of sufficient flow against the obstructing portion of the upstream ring, the upstream ring is slid into abutment with the downstream ring for closing the one downstream ring flow passageway for limiting fluid flow through the regulator. Upon dissipation of the sufficient flow, the upstream ring is spring biased away from the downstream ring. The means for selectively controlling the flow is selectively, operatively engaged to the downstream ring whereby the downstream ring may be selectively slid into abutment with the upstream ring for closing the one upstream ring flow passageway. The means include a selectively advanceable flow passageway closure member for closing the downstream ring against flow.

One benefit obtained by use of the present invention is an adjustable choke which operates to automatically limit high pressure peaks of flow from a well.

Another benefit obtained from the present invention is an adjustable choke which automatically regulates fluid flow from a flowing well that includes means for selectively adjusting the flow rate.

A further benefit of the present invention is an adjustable choke for regulating flow from a well which permits only limited flow of fluid under conditions of high pressure and which will permit greater flow of fluid when the high pressure dissipates and the pressure in the pipe line drops below a selected level.

Other benefits and advantages for the subject new adjustable choke will become apparent to those skilled in the art upon a reading and understanding of this specification.

BRIEF DESCRIPTION OF THE DRAWINGS

The invention may take physical form in certain parts and arrangements of parts, the preferred embodiment of which will be described in detail in this specification and illustrated in the accompanying drawings which form a part hereof and wherein.

DETAILED DESCRIPTION OF THE INVENTION

Figure 1:
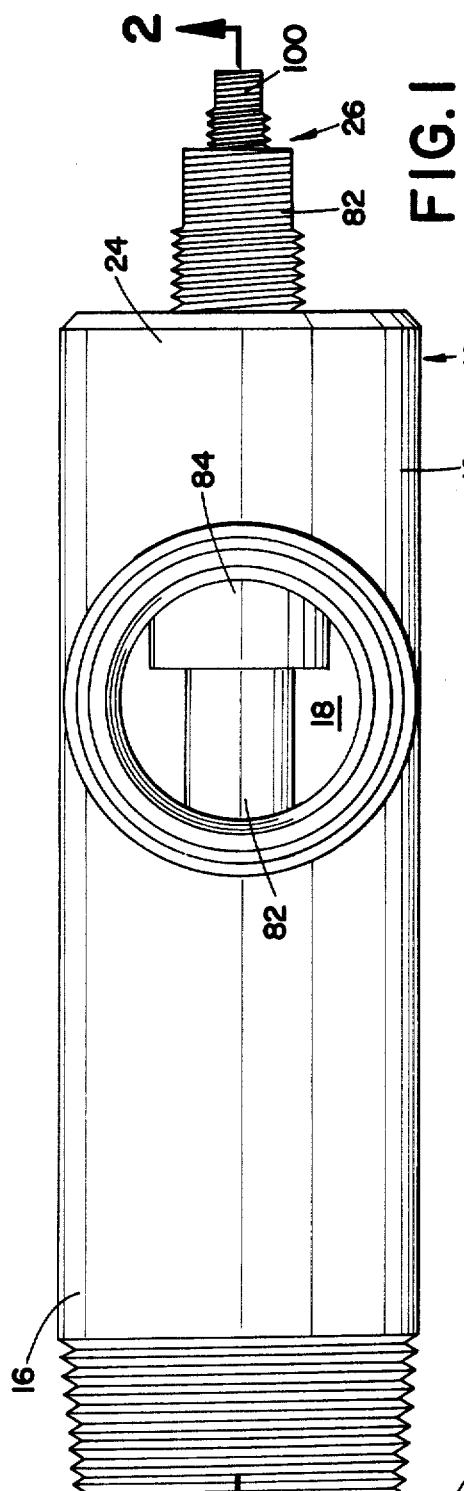
FIG. 1 is an elevated view of an adjustable choke formed in accordance with the present invention.

Referring now to the drawings wherein the showings are for purposes of illustrating the preferred embodiment of the invention only and not for purposes of limiting same, the figures show an adjustable choke 10 to be particularly employed in the oil and gas industry as a flow regulating device in a pipe line for a flowing or pumping well. Choke 10 is to be particularly employed for automatically limiting high velocity, high pressure flow through the pipe line such as occurs when a well is opened to flow after having been closed for a time. The choke 10 includes a generally cylindrical elongated body or housing 12 preferably having an axially-directed inlet port 14 at one end 16 and a radially-directed outlet port 18 intermediate of the housing 12. At an other end 24 of housing 12 means 26 for selectively controlling and adjusting flow through the choke 10 are provided. Preferably, the inlet end 16 of housing 12 is externally threaded for attachment to a pipe line (not shown). Mounted adjacent to outlet port 18 is a radially-directed, open-ended cup 30 which is internally threaded for attachment to a pipe line connection preferably upstream of a measuring device (not shown) used for measuring flow from the well. Cup 30 is mounted to housing 12 with conventional attachment means such as welding. Housing 12 and cup 30 are preferably constructed of a strong and durable material such as steel to resist the environmental hazards of outdoor installation and to inhibit tampering with the inner mechanisms of choke 10 which can cause particular damage.

Contained in housing 12 contiguous to inlet port 14, is a pair of slidable, adjustable members comprising a first member 36 and a second member 38. Housing 12 preferably includes a cylindrical inlet bore 40 and members 36 and 38 preferably comprise annular rings which are closely received in bore 40. First ring 36 is upstream of second ring 38 and is biased away from downstream ring 38 by a compressible biasing means such as spring 42. Alternate biasing means such as an elastomeric annular member or any other conventional biasing means which would allow free flow between members 36, 38 could be advantageously employed as an alternative to spring 42. Opposite of spring 42, upstream slidable ring 36 is supported by a support ring 44 whose outer periphery is received in a mating notch of bore 40. Support ring 44 preferably supports only a small portion of first ring 36 and is substantially open over most of its extent to provide for flow through the choke 10 and to allow sufficient exposure area for the first ring 36 for proper operation of the invention. Downstream ring 38 is supported opposite of spring 42 on a receiving shoulder 48 defining the intermediate axial extent of inlet bore 40 and the beginning of a reduced diameter outlet bore 50. Both support ring 44 and receiving shoulder 48 support only the outer peripheral ends of rings 36, 38 to avoid obstructing flow through rings 36, 38 and adjustable choke 10.

First ring 36 includes an inlet face 52, a first flow port 54 preferably centrally and axially disposed and, peripheral of first port 54, a solid or obstructing portion 56 for obstructing flow in bore 40. Second member or ring 38 includes a plurality of flow passageways comprising an axial second port 58 aligned with first port 54 and at least one third port 60 aligned with obstructing portion 56 of first ring 36. First port 54 is substantially larger than second port 58 or third port 60 individually, but the second and third ports are configured so that in combination all flow through first ring 36 may be accommodated by the second ring 38 when the rings are biased apart. Preferably, a plurality of third fluid ports 60 are spaced about second port 58 (FIG. 3) such that when third fluid ports 60 are obstructed by obstructing portions 56 of first ring 36, flow through rings 36, 38 will be substantially limited, as will hereinafter be more fully described. First slidable member 36 includes a first end face 64 configured for sealing engagement with an opposed end face 66 of second member 38. First end face 64 includes an annular butt shoulder 68 and a beveled shoulder 70 about first port 54. Butt shoulder 68 is the end face portion of obstructing portion 56 and is configured to seal third fluid ports 60 upon engagement of first ring 36 to second ring 38 during flow limiting operation of the invention. Opposed end face 66 includes an annular projection 72 about second port 58 for nesting reception in beveled shoulder 70 during sealing engagement. End faces 64, 66 have a reduced cross-sectional diameter from the overall diameter of rings 36, 38, to provide peripheral receiving shoulders 74, 76 respectively and an accommodating space for spring 42 during sealing engagement of the rings 36, 38.

The means for selectively controlling flow 26 preferably comprises an open-ended shaft 82 threadedly received in housing other end 24 through reception in a threaded receiving member 84 sealingly mounted in outlet bore 50. Shaft 82 selectively extends axially from other end 24 up to an abutting engagement with an outlet end face 86 of second annular ring 38 and is sealed in receiving member 84 with O-rings 88. A wrench flat 90 is provided at the exposed end of shaft 82 for threadedly advancing or withdrawing shaft 82 from housing 12. Preferably, shaft 82 is received at the outlet end face 86 of the second ring 38 in a second fluid port beveled shoulder 92 to provide a flow passageway from second fluid port 58 through shaft axial passageway 94. A generally radially-directed flow passageway 98 communicates shaft passageway 94 with outlet bore 50 and, ultimately, outlet port 18.

Threadedly received in shaft 82 is a threaded selectively-advanceable valve stem 100 including a wrench flat 102 at its exposed end. Valve stem 100 may be selectively advanced to close off radial flow passageways 98 and to seal second fluid port 58. Valve stem terminal end 104 may be nested in second fluid port beveled shoulder 92 to seal the port 58. Sealing O-rings 106 seal valve stem 100 against flow leakage.

Operation

Figure 3:
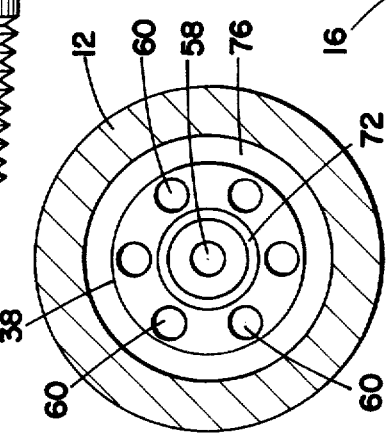
FIG. 3 is a cross-sectional view taken along line 3—3 of FIG. 2.
Figure 2:
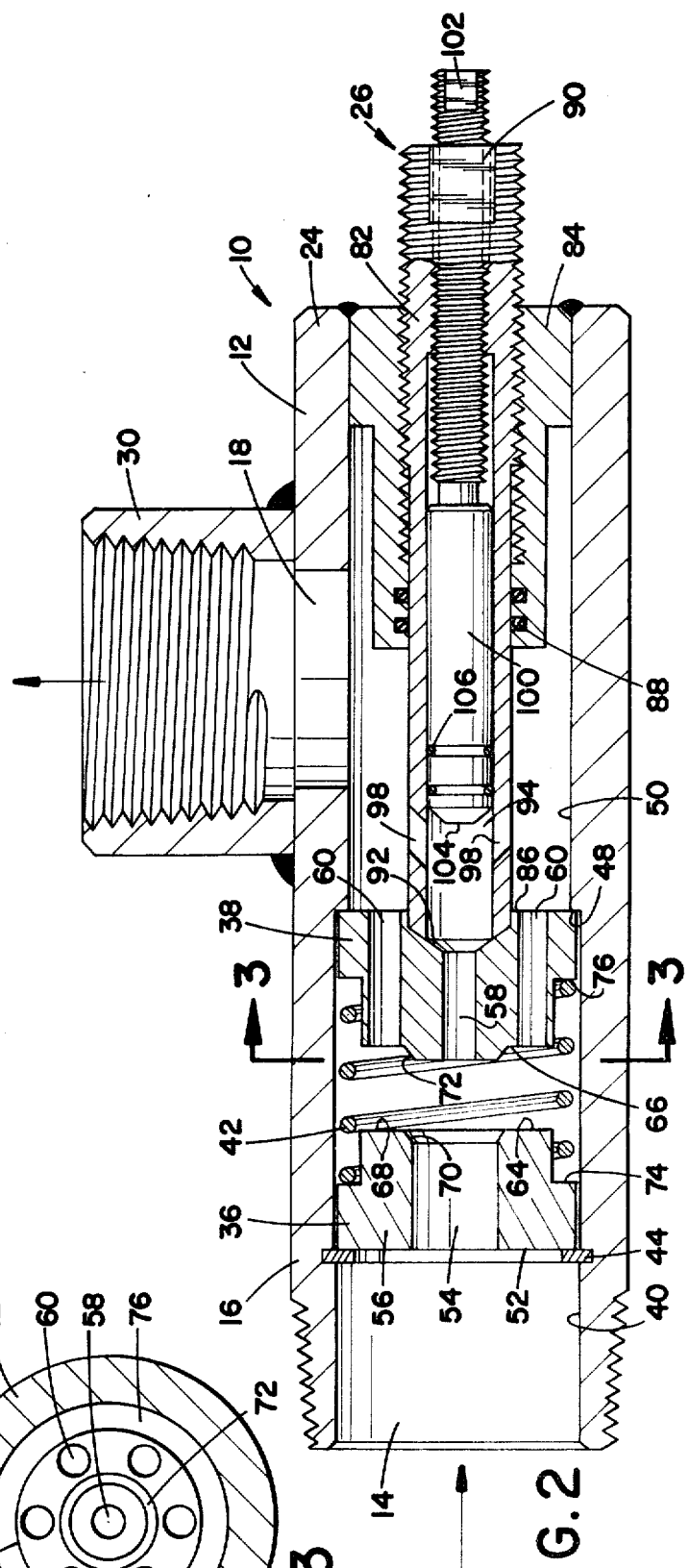
FIG. 2 is a cross-sectional view taken along line 2—2 of FIG. 1.

With particular attention to FIGS. 2 and 3, the improved flow regulating characteristics of the new adjustable choke will be specifically discussed. The invention has a double automatic regulating and selective sealing nature:

Annular rings 36, 38 may be automatically engaged to reduce flow through the choke 10 or may be selectively engaged to reduce flow or to seal off flow.

The automatic flow regulating nature of the invention exists in first annular ring 36 being spring biased from, and slidable towards, second annular ring 38. During normal flow levels, spring 42 exerts sufficient force to keep first ring 36 apart from second ring 38 despite the forces exerted upon the inlet end face 52 of first ring 36 on obstructive portions 56. Such expansion allows a maximum volume flow passageway through first port 54; through second port 58 to axial passageway 94, through radially-directed passageway 98 through outlet bore 50 to outlet port 18; and, from first port 54 through third ports 60 to outlet bore 50 and outlet port 18. Upon impingement of a sufficiently high pressure, high velocity flow from inlet port 14 upon first ring 36, first ring 36 is slid along bore 40 by the flow forces exerted on obstructing portions 56 to an abutting position against second ring 38. Butt shoulder 68 operates to close off third fluid ports 60 and thereby reduce the available passageway volume for flow to an amount defined by fluid flow through second fluid port 58 only. The flow passes from second port 58 through axial passageway 94 out through radially-directed passageway 98 to outlet port 18. Upon dissipation of the high pressure, high velocity flow, the spring 42 forces the first ring 36 apart from the second ring 38 to provide an increased volume available flow passageway. In addition, it is a particular feature of the invention that the spring 42 may be compressed to an extent that first ring 36 is not in sealingly engagement with second ring 38 but that the available volume flow path is reduced where only a reduced amount of flow may pass through the third fluid ports 60 due to nearness of the annular projection 72 to the beveled shoulder 70. The degree of compression of spring 42, and consequent automatic adjustment of first ring 36 to second ring 38, will therefore vary according to the pressure exerted upon spring 42 by the flow pressure.

The selective sealing aspect of the invention exists in the selective threaded advancement of shaft 82 and valve stem 100. After shaft 82 is positioned in abutting engagement with second ring 38, continued threaded advancement of shaft 82 into housing 12 will slide second ring 38 along bore 40 towards first ring 36 to reduce the available volume of flow path in a manner identical to when first ring 36 is automatically slid towards second ring 38. Upon abutting engagement of second ring 38 against first ring 36, third fluid ports 60 are closed off and shaft 82 may no longer be threadedly advanced into housing 12. Complete sealing of the flow path through choke 10 may then be effected by threadedly advancing valve stem 100 into shaft 82 such that the valve stem terminal end 104 bottoms out against second fluid port 58. However, mere advancement of the valve stem terminal end 104 past the radially-directed passageways 98 will substantially seal the choke 10 against flow.

Alternatively, shaft 82 need not be advanced to position second ring 38 against first ring 36 and second fluid port 58 may still be sealed against flow by advancing valve stem 100 into shaft 82 such that radially-directed passageways 98 are closed off or until valve stem 100 is bottomed out against second fluid port 58. In such a case, the invention could be employed as a flow sensitive shut-off valve whereby upon sufficient flow impinging against first ring 36 such that first ring 36 is advanced against second ring 38, all available flow paths will be cut off and the invention will operate to shut off flow.

The invention has been described with reference to the preferred embodiment. Obviously, modifications and alterations will occur to others upon a reading and understanding of the specification. It is my intention to include all such modifications and alterations insofar as they come within the scope of the appended claims or the equivalents thereof.

What is claimed is:

1. An adjustable choke apparatus for regulating fluid flow through a pipeline comprising:
   a housing including an inlet port and an outlet port;
   a first moveable member having a first port and contained in said housing contiguous to said inlet port;
   a second moveable member contained in said housing including a second port, at least one third port, an opposed end face configured for flow-sealing engagement with a first end face of said first member, and an outlet end face, said second port being aligned with said first port;
   means for compressibly biasing said first moveable member away from said second moveable member;
   means for selectively sealing said second port at said outlet end face; and,
   means for selectively engaging said first end face with said opposed end face for closing said third port;
   whereby upon impingement of a relatively high pressure flow against said first adjustable member, said first member is effected into sealing engagement with said second adjustable member and said third port is closed against flow, and whereby upon dissipation of said relatively high pressure flow, said first member is biased away from said second member to open said third port to flow.

2. The apparatus as defined in claim 1 wherein said first and said second adjustable members comprise annular rings, said first and said second ports being centrally and axially aligned in said rings respectively.

3. The apparatus as defined in claim 2 wherein said third port comprises a plurality of spaced peripheral ports about said second port.

4. The apparatus as defined in claim 3 wherein said first end face includes an annular shoulder for flow-sealing engagement to said peripheral ports for closing said peripheral ports against flow.

5. The apparatus as defined in claim 4 wherein said first end face includes an annular projection radially between said peripheral ports and said second port, and said opposed end face includes an annular beveled shoulder for nesting reception of said projection during flow-sealing engagement of said first member to said second member.

6. The apparatus as defined in claim 5 wherein said first port has a greater radial diameter than said second port.

7. The apparatus as defined in claim 2 wherein said means for compressively biasing comprises a biasing spring, received on a radially-outermost, annular first receiving shoulder of said first adjustable member and an axially-aligned second receiving shoulder of said second adjustable member.

8. The apparatus as defined in claim 1 wherein said means for selectively engaging said first end face with said opposed end face comprises a selectively advanceable shaft received in said housing at an end opposite of said inlet port.

9. The apparatus as defined in claim 8 wherein said shaft is threadedly received in said housing and includes an axial passageway, axially aligned with said second port whereby upon engagement of said shaft to said second adjustable member, a flow path exists from said second port through said axial passageway.

10. The apparatus as defined in claim 9 wherein said shaft includes at least one radially-directed flow passageway communicating said axial passageway with said outlet port.

11. The apparatus as defined in claim 10 wherein a selectively advanceable valve stem is received in said axial passageway for selective sealing engagement to said second port at said other end face.

12. The apparatus as defined in claim 11 wherein said valve stem is threadedly received in said axial passageway whereby upon threaded advancement of said valve stem beyond said radially-directed fluid passageway, said axial passageway is closed against flow to said outlet port.

13. A flow regulator for automatically limiting high-velocity flow through a pipeline comprising:
 a generally cylindrical elongated body having an axially-directed inlet port at one end, means for selectively controlling flow through the regulator at an other end, and a radially-directed outlet port intermediate of said body;
 a pair of slidable, annular rings contained in said body contiguous to said inlet port comprising an upstream ring and a downstream ring;
 means for spring biasing each of said pair from the other;
 said upstream ring including a flow passageway and a flow obstructing portion, said downstream ring including a plurality of flow passageways, at least one of said downstream ring flow passageways being disposed out of communicable flow alignment with said upstream ring flow passageway whereby upon impingement of sufficient flow against said obstructing portion of said upstream ring and said upstream ring is disposed into abutment with said downstream ring for closing said one downstream ring flow passageway for limiting fluid flow through said regulator, and upon dissipation of said sufficient flow, said upstream ring is spring biased away from said downstream ring;
 said means for selectively controlling flow being selectively operatively engaged to said downstream ring whereby said downstream ring may be selectively disposed into abutment with said upstream ring for closing said one downstream ring flow passageway and; said means including a selectively advanceable flow passageway closure member for closing said downstream ring against flow.

14. The apparatus as claimed in claim 13 wherein said upstream ring includes a single axial flow passageway and an annular obstructing portion circumferentially disposed about said single flow passageway.

15. The apparatus as claimed in claim 14 wherein said downstream ring includes an inner axial flow passageway aligned with said single flow passageway, and a plurality of peripheral flow passageways aligned with said obstructing portion.

16. The apparatus as claimed in claim 15 wherein said selectively advanceable flow passageway closure member is threadedly received in said body and axially aligned with said inner axial flow passageway.

17. The apparatus as claimed in claim 13 wherein said means for selectively controlling flow comprises a threaded shaft, selectively advanceable against said downstream ring for sliding said downstream ring into abutment with said upstream ring; an axial bore in said shaft; and, said selectively advanceable flow passageway closure member being received in said bore.

* * * * *